United States Patent
Geiman

[19]

[11] Patent Number: 6,119,869

[45] Date of Patent: Sep. 19, 2000

[54] WASTE DISPOSAL AND MANAGER SYSTEM

[76] Inventor: Janice E. Geiman, R.D. 3 Box 3354A Yingling Dr., Spring Grove, Pa. 17362

[21] Appl. No.: 09/084,902

[22] Filed: May 26, 1998

Related U.S. Application Data

[60] Provisional application No. 60/048,200, Jun. 2, 1997.

[51] Int. Cl.⁷ .......................................................... B07C 7/04
[52] U.S. Cl. .................................... 209/702; 209/703
[58] Field of Search ........................... 209/702, 706, 209/707, 930, 911, 928, 933; 232/1 E, 43.4, 44; 220/908, 909; 312/109, 211

[56] References Cited

U.S. PATENT DOCUMENTS

| | | | |
|---|---|---|---|
| 4,893,722 | 1/1990 | Jones ............................................. | 220/1 |
| 4,905,853 | 3/1990 | Stawder . | |
| 4,960,220 | 10/1990 | Foa . | |
| 4,987,988 | 1/1991 | Messina et al. . | |
| 5,007,581 | 4/1991 | Douglas ...................................... | 232/44 |
| 5,083,704 | 1/1992 | Rounthwaite ........................... | 232/43.2 |
| 5,190,165 | 3/1993 | Garfield, Jr. . | |
| 5,221,010 | 6/1993 | Bianco ....................................... | 209/702 |
| 5,228,577 | 7/1993 | Wilson ....................................... | 209/702 |
| 5,257,577 | 11/1993 | Clark ........................................... | 100/99 |
| 5,271,507 | 12/1993 | Evans, Jr. ................................. | 209/657 |
| 5,339,980 | 8/1994 | Stutler ....................................... | 220/571 |
| 5,366,097 | 11/1994 | Hazelwood ............................... | 209/704 |
| 5,377,907 | 1/1995 | Guard ........................................ | 232/43.2 |
| 5,425,458 | 6/1995 | Gilcreest et al. ....................... | 209/665 |
| 5,492,227 | 2/1996 | Millette et al. .......................... | 209/703 |
| 5,706,971 | 1/1998 | Taylor ....................................... | 220/523 |

*Primary Examiner*—Donald P. Walsh
*Assistant Examiner*—Daniel Schlack
*Attorney, Agent, or Firm*—Richard M. McMahon

[57] ABSTRACT

A Waste disposal and sorting system, having insulated push doors (10*a*) and (10*b*), enabling a one handed motion for immediate disposal and selective sorting of waste materials simultaneously and an outer container (12) having different sections (35) for the selective separate storage of waste for recycling purposes. The unit is position through passageways (14*a*) and (14*b*) in a wall of a building. An apparatus (48) is used for preventing glass from breaking in the disposing process in a recycling section.

6 Claims, 4 Drawing Sheets

WASTE DISPOSAL AND MANAGER SYSTEM

CROSS-REFERENCE TO RELATED APPLICATIONS

This application is entitled to the benefit of Provisional Patent application Ser. No. —60/048,200 filing date—Jun. 2, 1997.

BACKGROUND OF THE INVENTION

1) Field of the Invention

This invention relates to a garbage disposing and sorting system mainly for the instant disposal of trash (non-recyclable and recyclable) from a kitchen area of a home or facility, to an outer container, with an improved, one handed, one motion procedure.

2) Description of the Related Art

My invention provides an innovative method for both the disposal and the proper management of indoor waste, therefore greatly contributing to the art of indoor environmental quality. My invention also provides convenience, which is the key to successful recycling.

Waste, which accumulates and is stored temporarily within the kitchen area of a home is unsanitary, unhealthy, and unattractive. Germs and contaminants from discarded trash, temporarily stored in the kitchen area, can have unhealthy effects. A multiple of containers may also be needed for the separation of recyclable waste materials. These containers take up much needed space in our kitchens. This is not a fitting place for the collection of trash. Trash that is stored for even a short period of time can result in germs, bacteria, and odors. Trash attracts flies and other insects resulting in other areas of your kitchen and home becoming infested with germs as well. Flies are known to be carriers of several diseases. Flies pick up their germs from garbage and can quickly spread contamination. Dangerous insecticides used for fly control, such as DDT, were known to have destructive environmental consequences. Carcinogenic (cancer causing) effects were also suspected. Flies also develop a resistance to the different pesticides. The disposal of garbage and good sanitation is the best method of fly control and these conditions.

Where does all this garbage go? We have also learned that our present methods of discarding garbage are causing soil, water, and air pollution. The U.S. generates more solid waste than any other country. Each of us is responsible for almost 1 ton a year. As a result we are running out of locations to dispose of our trash. Our air is polluted from industries that produce: plastics, glasses, metals, and paper. This is a perfect reason for recycling these materials. For every 1 ton of paper recycled, we could save 17 trees. Fifty million tons of paper are thrown in landfills each year in the U.S.. Modem glass needs at least 4,000 years to decompose. Americans throw away 28 billion glass bottles and jars per year. Plastic products will never decompose, but they are recyclable. Environmentalists believe that, as populations and their demands increase, the idea of continuous growth must give way to a more rational use of the environment, but that this can be accomplished only by a dramatic change in the attitude of the human species.

A number of U.S. patents were uncovered during my search. These devices found in the area of search are not designed as efficiently for solving the problems of present art. These devices lack the convenience, which is the key to the success of proper waste management. People will recycle if made easy. Some devices are also not very feasible or practical for the jobs of disposing and containing the waste. Some of the closest relating patents found are U.S. Pat. No. 5,492,227, Millette, on Feb. 20, 1996, U.S. Pat. No. 5,228,577, Wilson, on Jul. 20, 1993, U.S. Pat. No. 5007581, Douglas, on Apr. 16, 1991, U.S. Pat. No. 5,425,458, Gilcreest and Svihlik, on Jun. 20, 1995, and U.S. Pat. No. 4,960,220, Foa, on Oct. 2, 1990.

The patent No. 5,492,227 issued to Robert T. Millette discloses, on an inside wall unit is a hinged, insulated cover. This cover must first be lifted for access to the passage ways, requiring two hands to operate. When the cover of the unit is opened, it exposes all of the conduits. The conduits extend first outward and then bend downward leaving an elbow for materials to travel through to unconcealed bins or containers below.

The Wilson U.S. Pat. No. 5,228,577's apparatus is of a much greater complex and expensive construction. The Douglas Pat. No. 5007581 is a device where garbage must pass through a conduit and then in a direct straight pathway through a chute, in the hood of a unit. Also one unit is only used for one type of waste material. The design of this unit also might not appeal to everyone. The Gilcreest and Svihlik U.S. Pat. No. 5,425,458 is also a device of great complexity.

Prior art uncovered in my search suffers from a number of disadvantages:

a) Some of the closest related devices are very complex and not economical for the common everyday individuals to benefit from.

b) Other devices are not very practical or effective, for the jobs of present art and are not presently benefitting the public or our environment c) Some of the designs are cumbersome and not appealing in appearance and lack the ingredients of success.

BRIEF SUMMARY OF THE INVENTION

In accordance with the present invention a waste disposal and separator system comprising of, one-handed operating push-doors to effortlessly dispose of, selectively sort, and securely contain waste materials, into an outer storing container, completely accomplished in one motion.

Accordingly, several objects and advantages of my invention are:

To provide a system which will permit immediate disposal of waste materials. Eliminating the unsanitary act of storing trash indoors. Furthermore to eliminate the smells, germs, and flies caused by storing garbage indoors. Facilities such as: hospitals, day cares, schools, restaurants, and others are presently storing waste materials indoors, in their kitchen areas.

To provide a system including a separate, insulated, spring-loaded, push-door, to dispose of each different type of waste material. This door encourages recycling by granting an effortless, one-handed motion, to dispose of garbage, while separating the recyclable materials.

To provide a system which uses only the force of gravity, with no expenditure of energy being required in the operation.

To provide a system which will save much needed space inside of the home or a building.

To provide a system for the common household individual to keep up with today's demands for recycling, by lessening the work load of the individuals who are required by law to recycle.

To provide a system which includes an attractive secure container for storing the different categories of waste materials.

To provide a system in which the outer container has access doors to each sectioned off compartment, for easy access to the different kinds of materials and to dispose of larger items or retrieve particular materials or items.

To provide a system in which the outer container can hold 35 gallon capacity bags. Replacing the containers inside, that hold approximately a 13 gallon capacity bag. This will clearly reduce time needed in the transporting of waste materials for the individual and will dramatically cut down on the number of bags needed for each individual.

To provide a system which has an easy method of exchanging the bags.

To provide a system with an apparatus for preventing any glass breakage as the materials are being disposed of. This apparatus is placed into the bag of the recyclable section, in the outer container, and has an inexpensive and effective construction.

To provide this apparatus with an effective, functional design, which can smoothly be placed into the bag and easily be lifted out, when exchange of bags is necessary.

To provide a system which the outer container has rings to fasten and hold the bags in place and slides and rails to easily retrieve full bags and replace new bags.

To provide a system with an illuminating panel for the ability to see when the bags are full, from the inside through the push doors. This panel allows an efficient amount of light into the container, and also a screened air-way for garbage to breath to prevent the odors from being trapped in and entering back up through the unit.

To provide a system with a screened opening on the bottom side of the container, to allow water to escape, when container is being cleaned.

Further objects and advantages are to provide a system which will eliminate the storing of waste materials inside the kitchen areas of homes and facilities. This device bears a simple, effective, and inexpensive design, providing a more desirable way for individuals to dispose of waste, store waste and sort recyclable materials, all in the same handling. Furthermore to insure a more sanitary, and healthier, eating environment for all and insure recycling even by the busiest or most neglectful individuals.

BRIEF DESCRIPTION OF THE SEVERAL VIEWS OF THE DRAWINGS

In the drawings, closely related figures have the same number but different alphabetic suffixes.

SHEET 1 of the drawings

SHEET 2 of the drawings

SHEET 3 of the drawings

SHEET 4 of the drawings

Figure 1:
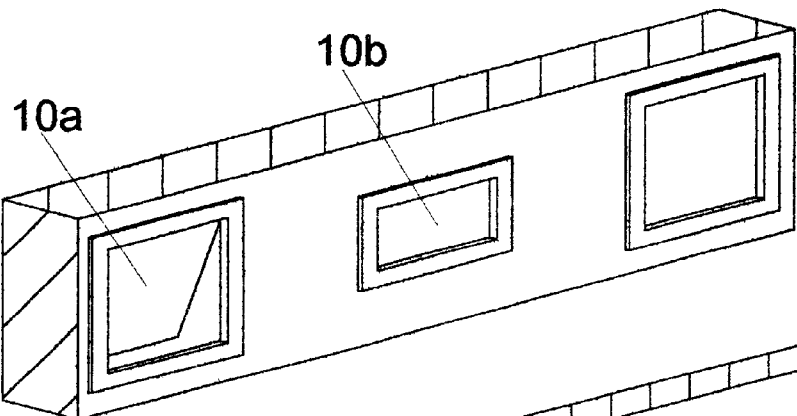
FIG. 1—is an overall perspective view, from the inside of a home or building, showing push doors, mounted to passageways, through an interior wall. One door being partially opened and one being of a different size.

REFERENCE NUMERALS IN DRAWINGS 10a larger push door
10b smaller push door
12 container
14a larger passageway through a wall
14b smaller passageway through a wall
16 top of container
18 right side of the container
20 left side of the container
22 Illuminating panel
24 front side of container
26 screened hole in floor of container
28 floor of container
30 back side of unit
32 magnetic rubber seal
34 spring
35 sections members
36 doors of container
38 divider walls
40 slide
42 rails
44 secure ring
46 independent ring
48 glass shatter prevention apparatus
50 flaps
52a center section of flaps
52b outer section of flaps
54 plastic ring
54a flat section of ring
56 second set of flaps
58 support members
60 flat section of support members
62 storage area

DETAILED DESCRIPTION OF THE INVENTION

In the preferred form of the invention shown on (sheet 1, FIG. 1) are three insulated, spring loaded, push doors #10a, and #10b. The push doors 10a & 10b are of a predetermined size to allow everyday articles, of the category of choice, to pass through. Push doors are mounted over and cooperate with passageways (#14a, in FIG. 2 and #14b, FIG. 3 of sheet 2) through a wall of preferably the kitchen area of a home or building. For example, the push door 10b and passageway 14b are shown smaller then the other two. This door would be used, for example, as a paper section (#35 shown later in detail on sheet 4 FIG. 7) and does not need to be as big as the door 10a and passageway 14a used for example in recyclable section 35.

Figure 2:
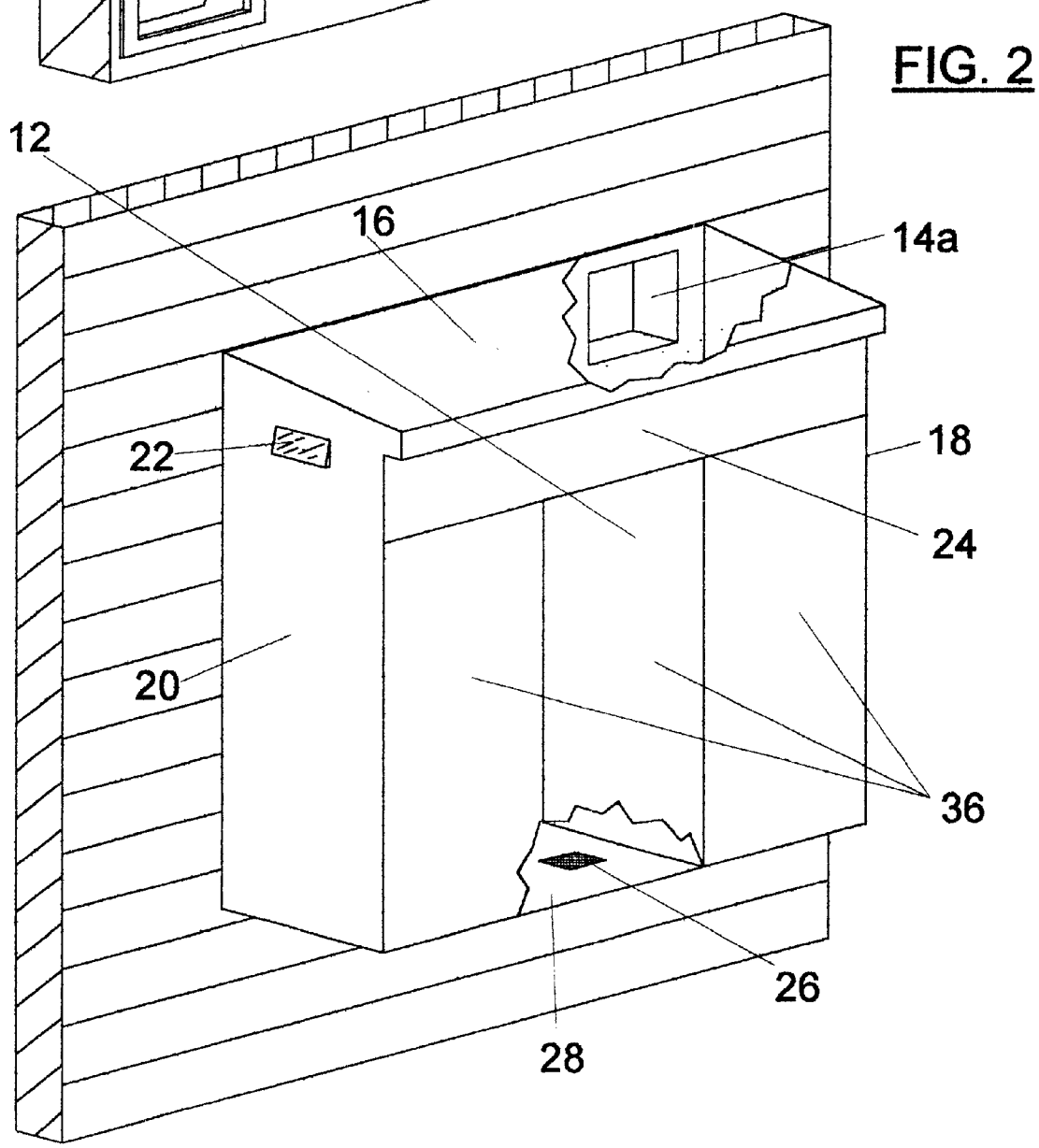
FIG. 2—is an overall perspective view of an outer classifying and storing container of the present invention. The container is shown mounted on the opposite side of the interior wall, with two cutaway views. One showing a passageway through the wall and into the container and another showing a screened opening on the containers floor.
Figure 3:
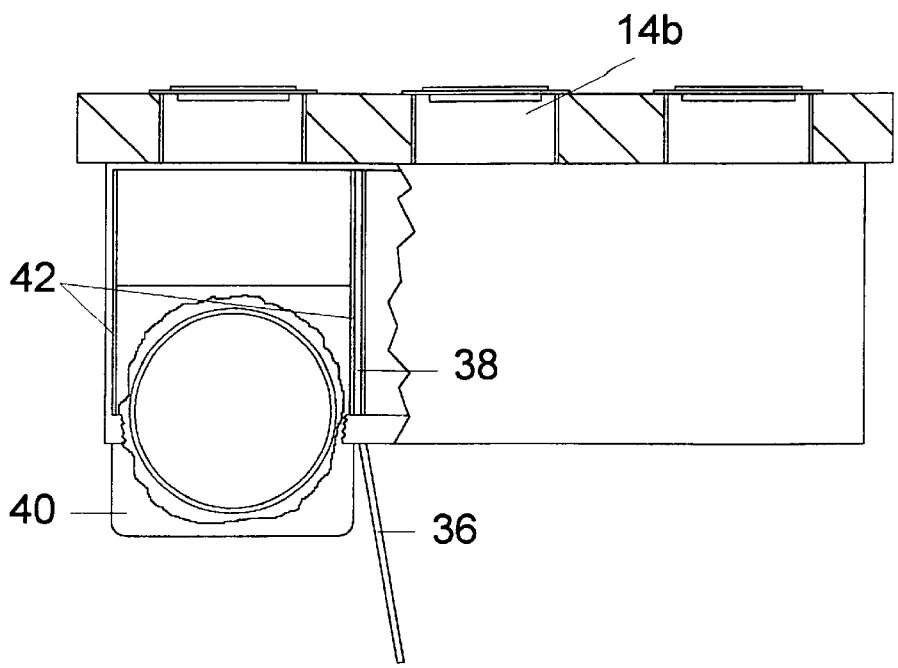
FIG. 3—is a top view of an entire unit mounted to a wall. Shown here are three push doors, mounted to passageways, through a wall, to cooperate with the outer container. A cutaway view is showing one inside section of the outer container. One door of the container open and a slide, with a bag, partially pulled out FIG. 4—is a view showing a back side of the outer container. Shown here are openings, through the backside of the container, these openings cooperate with the passage ways in the wall.
Figure 4:
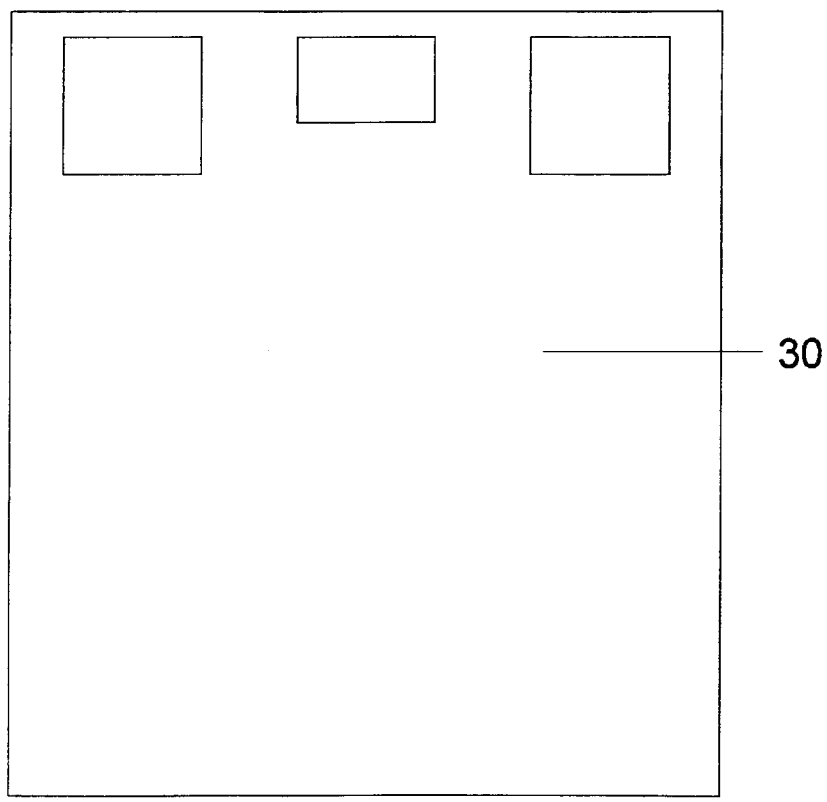

On sheet 1, FIG. 2 is a classifying and storing container #12 of the present invention shown here having three different sections 35 for three different types of waste materials. The passageways 14a & 14b in the wall cooperate with the sections 35. The size of the container 12 depends on the individual's preference as to how many different sections 35 are needed for that individual's needs. The container 12 shows container doors #36 on the front side #24 of the container 12. Container doors 36 cooperate with sections 35 of the container 12. Container 12 is shown here with a top #16. On the sides 18 and 20 is also an illuminating panel #22 shown on the left side 20. The panel 22 is at a predetermined location to allow an efficient amount of light into the container, for the ability to see when the bags are full, from the inside through the push doors 10, and to allow an air-way for garbage to breath. This is important to avoid any odors to be trapped in and enter back up through the push doors 10. A floor #28, of the container has a screened opening #26 to allow water to escape when unit is being cleaned.

A back side #30 of the container 12 is mounted to the opposite side of an interior wall. The inside of the container 12 is sectioned off by divider walls #38, shown on sheet 2, FIG. 3. Each section 35 of the container 12 has a slide #40 and rails #42 for the ability to easily change bags. The bag hangs through a cut-out in the slide 40.

Figure 5:
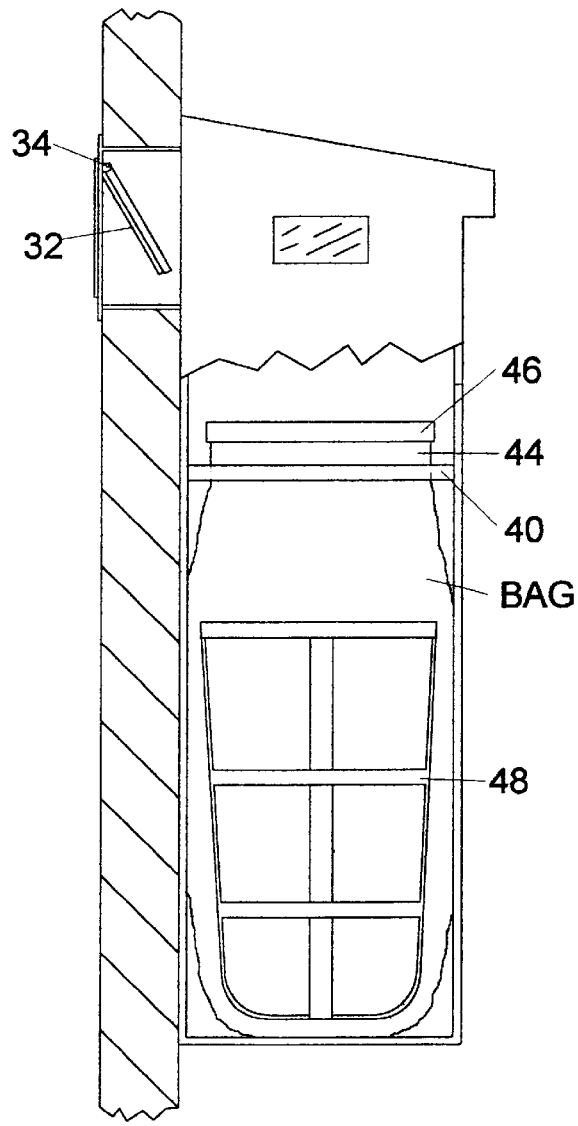
FIG. 5—is a side view of the entire unit, showing a push door, a passageway through the wall, and the container of the present invention. A cutaway view shows rings and a slide, holding a bag. An apparatus is shown here inside of the bag. The apparatus is used to prevent glass breakage inside of the bag, of a recyclable section, of the container.
Figure 6A:
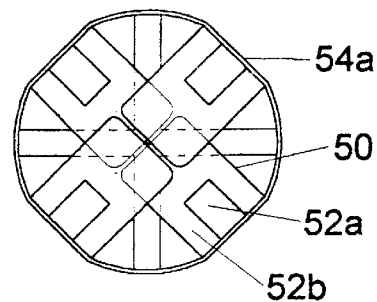
FIG. 6a—is a top view of the apparatus, showing the flaps in pairs, and how they are positioned with lower sets being offset 90 degrees.
Figure 6B:
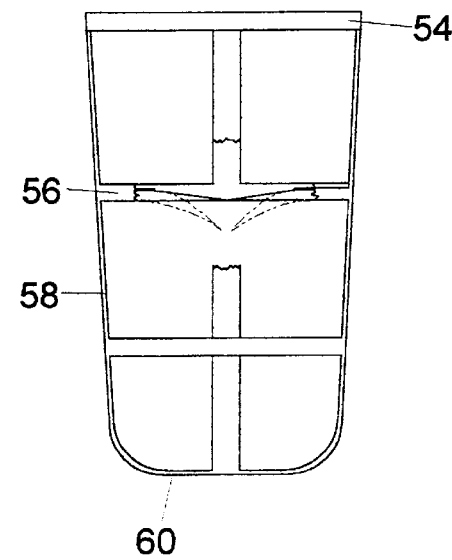
FIG. 6b—is a side view of the apparatus, showing support members, and the different sets of rings and flaps.

On the slide 40 is a secured ring #44 (shown on sheet 3, FIG. 5) in which a bag is placed over. The bag is positioned in an opened manner and hangs from the ring 44. An independent ring #46 is then placed over the secured ring 44 with a sufficient fit for holding the bag secure. The push doors 10a & 10b have a magnetic rubber seal #32 to give protection from the outer elements. A spring #34 allows the doors 10 to be operated by a one handed push. Inside of the bag of a recyclable section is a glass shatter prevention apparatus #48 (shown on sheet 3, FIG. 5 and FIG. 6a & 6b). This apparatus 48 is used to slow down the articles as they are entering the bag to prevent any glass breakage from occurring. The top view of FIG. 6a shows a flexible rubber flap #50 where articles must pass through when entering the bag. Flaps 50 shown here work together in pairs and are mounted to plastic rings #54, (FIG. 6b) with flat sections #54a where the flaps are joined. Flaps 50 have a denser design in the center section #52a and have less density on the right, left, and front sections #52b of the flap. This design will allow the lighter, smaller items, for example a baby food jar, the ability to pass through the flaps, but still maintain the slowing down control needed, while allowing a more resistive power to the larger, heavier items. The first pair of flaps 50 and ring 54 shown here are the largest of a series with the following sets decreasing in size. This design allows an easy entrance into the bag. Each set shown here is arranged in a horizontal position and is offset 90 degrees from the overhead set. The second lower set #56, is shown to have an offset 90 degrees from the top set 50. A plurality of elongated support members #58, (legs) of equal lengths that connect at the bottom give support to the rings 54 and flaps 50. The side view of the apparatus shows a flat section #60, where supports 58, cross. This design prevents the bag from tearing when the apparatus is placed into or taken out of the bag.

Figure 7:
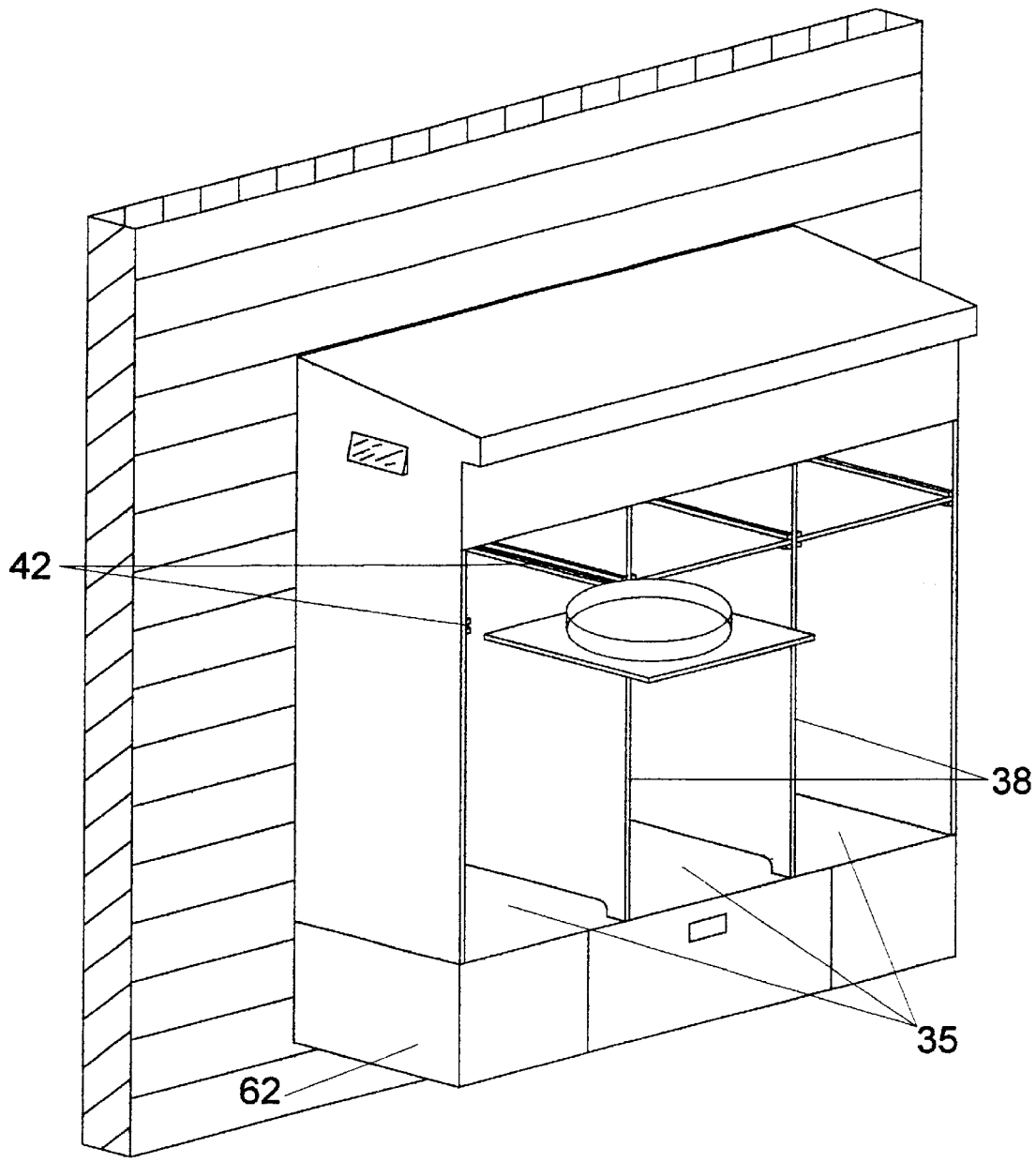
FIG. 7—is an overall perspective view of the outer container, with the doors removed, to show, the preferred construction of, inside sections and divider walls. Also a slide/ring pulled completely out of the container, to show detail of, rails, slide, and a secured ring. This view is also showing an optional storage area, on the bottom of the container.

An overall perspective view of the outer container is shown on sheet 4, FIG. 7 with the doors removed, to show the preferred construction of, inside sections #35 and divider walls 38. Also a slide 40 and an independent ring 46 are pulled completely out of the container, to show detail of, rails 42 slide 40 and ring 46. This view is also showing an optional storage area #62 on the bottom of the container.

From the description above a number of advantages of my waste disposal and manager system becomes evident.

a) The invention is designed to be inexpensive to construct and cost free to operate.

b) The invention is designed for: the immediate disposal of garbage from a kitchen, the separation of garbage, and the secured storing of the different types of garbage. This is all accomplished in a one-handed, effortless motion. Thereby eliminating the storage of garbage indoors and the time consuming chores of: taking out the trash and sorting the different types of waste materials for recycling purposes.

c) The outer container is one attractive, inexpensive unit, thus eliminating a multiple collection of containers otherwise needed in storing garbage inside and out, and is also secure from the wind, weather, or predators.

Accordingly, the reader will see that the disposal and management system of this invention can pave a new pathway for improving the quality of our indoor environment and will contribute considerably to the untold environmental problems we face. A Lot has been done to encourage recycling but still we have a long way to go. People will recycle if it is made easier. Convenience is the key to successful recycling.

Although the description above contains many specificities these should not be construed as limiting the scope of the invention but as merely providing illustrations of some of the presently preferred embodiments of this invention. For example the outer container can have one or more sections and can be smaller or used for example, outside of a bathroom. Also the outer container may have the optional storage area for storing items for example, the replacement bags, the full bags, or garden gloves and tools etc. The outer container maybe placed outside, or for example, in a garage, or on a back porch etc. A passageway might not cooperate with the container for example a door used for liquids or composting or something not stored inside of a bag or container. The outside container might not hold bags in every section. For example it may have just a plastic container sitting on the containers floor, etc.

Thus the scope of the invention should be determined by the appended claims and their legal equivalents, rather then by the examples given.

I claim:

1. A method of disposing while separating and containing garbage which comprises providing, in combination, a plurality of operating means which permit a human the ability to instantly dispose of while selectively separating and securely containing garbage simultaneously and in one motion from an indoor environment to outer storing and separating containers, comprising:

a) providing passageways from said indoor environment to said outer containers, wherein each outer container is connected to each individual operating means by a single passageway;

b) providing at least one container designated for glass items;

c) providing glass shatter prevention means in the at least one glass-designated container or its corresponding passageway, or both, which will hinder the speed of said glass items as they enter the glass-designated container;

wherein each said operating means is a push door and each said push door cooperates with each said passageway and each said passageway cooperates with its corresponding container; and wherein the garbage falls into the containers by the force of gravity alone.

2. The method of claim 1, wherein the glass shatter prevention means comprises:
   a) flexible flaps of a predetermined number and size and form to give a correct resistance power to different sizes of glass articles as they pass through the glass-designated passageway or container whereby lessening the impact and preventing breakage of glass;
   b) rings of a predetermined size for supporting said flaps whereby ring size can be constructively tailored as needed for the ability to be smoothly slipped into a bag and easily taken out of said bag;
   c) support members of a predetermined size for supporting said rings; and
   d) means for connecting said flap to said ring and said ring to said support member so that the glass shatter prevention means is able to of hinder the speed of glass articles as they pass through said glass-designated passageway or container with the correct resistance power for different sizes of said articles.

3. The method of claim 1, wherein each push door defines the entrance of its corresponding passageway, wherein each passageway is formed of a predetermined size and through a wall from the interior of the wall to the exterior of the wall, whereat is located each corresponding container.

4. An apparatus for disposing while separating and containing garbage which comprises a plurality of operating means which permit a human the ability to instantly dispose of while selectively separating and securely containing garbage simultaneously and in one motion from an indoor environment to outer storing and separating container, comprising:
   a) passageways from said indoor environment to said outer containers, wherein each outer container is connected to each individual operating means by a single passageway;
   b) at least one container designated for glass items;
   c) glass shatter prevention means in the at least one glass-designated container or its corresponding passageway, or both, which will hinder the speed of said glass items as they enter the glass-designated container;

wherein each said operating means is a push door and each said push door cooperates with each said passageway and each said passageway cooperates with its corresponding container; and wherein no mechanical or electrical means are utilized to assist articles passing through the passageways.

5. The apparatus of claim 4, wherein the glass shatter prevention means comprises:
   a) flexible flaps of a predetermined number and size and form to give a correct resistance power to different sizes of glass articles as they pass through said apparatus, whereby lessening the impact and preventing breakage of glass;
   b) rings of a predetermined size for supporting said flaps whereby ring size can be constructively tailored for the apparatus for the ability to be smoothly slipped into a bag and easily taken out of said bag;
   c) support members of a predetermined size for supporting said rings; and
   d) means for connecting said flap to said ring and said ring to said support member so that said glass shatter prevention means is designated to perform the function of hindering the speed of glass articles as they pass through the apparatus with the correct resistance power for different sizes of said articles.

6. The method of claim 4, wherein each push door defines the entrance of each corresponding passageway, wherein each passageway is formed of a predetermined size and through a wall from the interior of the wall to the exterior of the wall, whereat is located each corresponding container.

* * * * *